Fig.1

Aug. 1, 1933.   L. S. C. TIPPETT   1,920,329
HIGH SPEED RELAYING EQUIPMENT
Filed May 1, 1930   2 Sheets-Sheet 2

INVENTOR
Leonard S. C. Tippett
BY
ATTORNEY

Patented Aug. 1, 1933

1,920,329

UNITED STATES PATENT OFFICE 1,920,329

HIGH-SPEED RELAYING EQUIPMENT

Leonard S. C. Tippett, Sydney, Australia, assignor to Westinghouse Electric & Manufacturing Company, a Corporation of Pennsylvania Application May 1, 1930. Serial No. 448,988

22 Claims. (Cl. 175—294.)

For the past few years, it has been becoming more and more apparent that numerous advantages are attainable with respect to the stability of transmission systems by the quick clearing of faults. It has been discovered that it is practicable to clear a fault on a transmission line in such a short period of time that stability is not lost. The accomplishment of this purpose has required a complete revision of the time-honored practices of the relay art.

It is the object of my present invention to produce a new relaying system which is adapted for such high-speed service.

One of the more specific objects of my invention is to produce, what may be termed, a phase-sequence relaying system, whereby the distance of an unbalanced fault (not a three-phase fault) from the relaying point may be indicated by a phase-sequence network responding solely to the negative and zero sequence components of the polyphase line-to-ground voltage at the relaying point.

More specifically, I propose to measure the distance of a single-phase line-to-ground fault accurately, regardless of the ground resistance, and involving the use of nothing more than a standard reliable plunger-type voltage-relay picking up instantaneously upon the application of a predetermined voltage which is derived from a simple network connected to the potential transformers of the transmission line at the relaying point.

Another one of the more specific objects of my invention is to make correction for the zero-phase-sequence current flowing in the current transformers of relaying equipment at the time of an unbalanced fault on the line. Heretofore, it has been the standard practice to connect current transformers in star. Such connection was used for the slow-speed relaying service heretofore prevalent and it is still needed for much of the station apparatus, such as ammeters, wattmeters, over-current protection and other purposes. Analysis by the method of symmetrical coordinates has shown that star-connected current transformers do not give an absolutely accurate response for unbalanced line-to-line faults. While this error was not of importance in connection with the slow-speed relaying systems of the prior art, it is of very material importance in connection with the more exacting relaying requirements of high-speed service. I have, therefore, introduced a new practice in the relaying art by utilizing two groups of current transformers, one group being connected in star, as heretofore, and the other group being connected in delta for the purpose of supplying current to the current coils of star-connected relaying devices for detecting, and responding to, line-to-line faults.

With the foregoing and other objects in view, my invention consists in the systems, methods and apparatus hereinafter described and claimed and illustrated in the accompanying drawings, wherein:

In explaining the theory of operation of my new relaying system, I shall assume that the reader has a knowledge of Dr. C. F. Fortescue's mathematical analysis by means of symmetrical coordinates, as set forth in his paper in A. I. E. E. Transactions, 1918, page 1027, or in his Patent No. 1,658,980, granted February 14, 1928, particularly from page 2, line 120 to page 5, line 90 of the latter. A knowledge will also be assumed of the application of this system of analysis to the calculation of line faults, as set forth in a paper by R. D. Evans and C. F. Wagner in A. I. E. E. Transactions, 1926, page 51, particularly pages 58—59 and 61 and Appendix II thereto on pages 73—79; also a series of articles on the same subject by Wagner and Evans in The Electric Journal, March, 1928, pages 151—157; April, 1928, pages 194—197; June, 1928, pages 307—311, particularly pages 308—309; July, 1928, pages 359—362; September, 1929, pages 425—431, particularly page 428; and December, 1929, pages 571—581, particularly pages 571—574.

It has recently been discovered, by careful tests, that the negative-phase-sequence impedance of large dynamo-electric machines such as are used on transmission lines is very nearly equal to the positive-phase-sequence impedance thereof, and it was already known that this condition holds true for the transmission lines themselves and for the transformers connected thereto.

My invention, or the phase-sequence part of it, is based upon the assumption that the positive and negative sequence impedances of the line are equal, which is true, within a very close margin, for the vast majority of transmission systems.

I have discovered that if an arbitrary quantity equal to twice the negative-phase-sequence line-to-ground voltage component $E_{A2}$ plus the zero-phase-sequence line-to-ground voltage component $E_{AO}$ is measured at different points along a line, this quantity will be zero during normal conditions, but will assume various different values for different fault conditions and locations of fault. In particular, when a single-phase line-to-ground fault occurs, the quantity $(2E_{A2}+E_{AO})_F$ at the fault F will be equal to the normal star voltage $E_{An}$ of the system. At any other point S, the quantity $(2E_{A2}+E_{AO})_S$ will have a smaller value, depending on the various impedances, as will be subsequently proved.

I am thus enabled to utilize this arbitrary quantity $(2E_{A2}+E_{AO})$, or a modification thereof to correct for variable ground resistances, as a relaying voltage, with a suitable transformation ratio, making possible the use of simple overvoltage relay elements, instead of elements involving current, or both voltage and current, or even more complicated devices. I am further able to secure, for the first time, really accurate ground detection and correct relaying therefor, particularly on single-circuit lines where there is no opportunity for balanced-current ground detectors.

Indicating star phases by capital subscripts A, B, C and the opposite delta phases by lower-case subscripts $a$, $b$, $c$, respectively, we have, at any point in the line, during any condition of operation,—

$$2E_{A2} = \tfrac{1}{3}(2E_A + 2a^2 E_B + 2a E_C) \quad (1)$$

$$E_{AO} = \tfrac{1}{3}(E_A + E_B + E_C). \quad (2)$$

Since
$$1 + a + a^2 = 0,$$

$$(2E_{A2} + E_{AO}) = \tfrac{1}{3}[3E_A + (a^2 - a)(E_B - E_C)]. \quad (3)$$

But
$$\frac{a^2 - a}{3} = -j\frac{1}{\sqrt{3}}, \; E_B - E_C = -E_a, \; j^2 = -1,$$

$$\therefore (2E_{A2} + E_{AO}) = E_A + j\frac{1}{\sqrt{3}} E_a. \quad (4)$$

Figure 2:
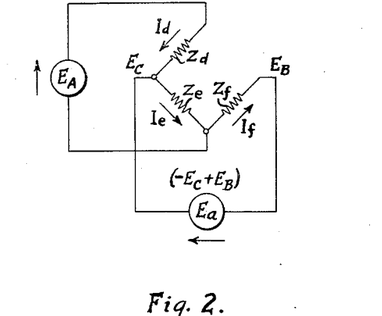
Fig. 2 is a simplified network diagram from which the values of the impedances in my phase-sequence network are calculated.

This relaying voltage $$(2E_{A2} + E_{AO}) = E_A + j\frac{1}{\sqrt{3}} E_a$$

may be derived from the line voltages $E_A$, $E_a$ by an open network as shown in Fig. 2, wherein a voltage $nE_A$, proportional to $E_A$, is applied across two impedances $Z_d$ and $Z_e$, while the voltage $E_a$ is applied across the impedance $Z_e$ and a third (as yet unknown) impedance $Z_f$. The corresponding currents flowing in such a network are indicated in Fig. 2.

We have, noting that $$I_f = I_a, \; I_c = I_d + I_f, \; nE_A = I_d Z_d + (I_d + I_f) Z_e =$$
$$I_d(Z_d + Z_e) + I_f Z_e + I_f(Z_e + Z_f).$$

$$E_a = (I_d + I_f) Z_e + I_f Z_f = I_d Z_c$$

$$\therefore I_d = \frac{nE_A(Z_e + Z_f) - E_a Z_e}{Z_d Z_f + Z_e(Z_d + Z_f)} \quad (5)$$

$$I_f = \frac{E_a(Z_d + Z_e) - nE_A Z_e}{Z_d Z_f + Z_e(Z_d + Z_f)}, \quad (6)$$

and since
$$I_c = I_d + I_f,$$

$$I_c = \frac{nE_A Z_f + E_a Z_d}{Z_d Z_f + Z_e(Z_d + Z_f)}. \quad (7)$$

If we use the relay coil for the middle impedance $Z_e$, we find, from Equation (7), that the numerator of the fraction expressing the relay current $I_c$ is independent of the impedance $Z_e$ of the relay coil.

We may rewrite Equation (7) in the following form:

$$E_c = I_c Z_e = \frac{nZ_e Z_f}{Z_d Z_f + Z_e(Z_d + Z_f)}\left[E_A + \frac{1}{n}\cdot\frac{Z_d}{Z_f}\cdot E_a\right]. \quad (8)$$

Therefore, the first condition which we must satisfy in order to obtain $$(E_A + j\sqrt{\tfrac{1}{3}} E_a)$$

on the relay is that $$\frac{1}{n}\cdot\frac{Z_d}{Z_f} = j\sqrt{\tfrac{1}{3}}. \quad (9)$$

This equation may be satisfied by making $Z_d = K$, a pure resistance, and by making $Z_f = -jM$, a condenser. Then $$\frac{1}{n} \cdot \frac{K}{-jM} = j\sqrt{\tfrac{1}{3}}, \quad (10)$$

or
$$M = \sqrt{\tfrac{3}{n}} K. \quad (11)$$

If we use a relay coil having an impedance $$Z_e = (p + j) L,$$

we may express the other impedances as fractions of the relay reactance L, and put $$Z_d = K = kL$$
$$Z_f = -jM = -jmL.$$

The expression outside of the bracket in Equation (8) then becomes $$\frac{nZ_e Z_f}{Z_d Z_f + Z_e(Z_d + Z_f)} = n\frac{M - jpm}{(pk + m) + j(k - km - pm)}.$$

If we should choose, for example, $m = k = 1 - p$, $n$ becomes equal to $\sqrt{3}$, from Equation (11), and the expression outside of the bracket in Equation (8) becomes $$\sqrt{3}\frac{(1-p)(1-jp)}{1-p^2}.$$

If we further assume that the resistance component $p$ of the relay impedance $Z_e$ is negligibly small, the expression outside of the bracket in Equation (8) becomes equal to $\sqrt{3}$. We would then have, for the voltage applied to the relay, $$E_c = I_c Z_e = \sqrt{3}\left[E_A + j\sqrt{\tfrac{1}{3}} E_a\right] =$$
$$-j(E_a - j\sqrt{3}\, E_A). \quad (12)$$

It is to be noted that a choke coil having an inductance $Z_f = jM$ could be used in place of the condenser $Z_f = -jM$ if we apply $-E_a$ instead of $E_a$ to the network in Fig. 2. In this case, Equation (8) becomes $$-E_c = -I_c Z_e = \frac{nZ_e Z_f}{Z_d Z_f + Z_e(Z_d + Z_f)}\left[E_A - \frac{1}{n}\cdot\frac{Z_d}{Z_f}\cdot E_a\right], \quad (8')$$

and Equation (9) becomes $$\frac{1}{n}\cdot\frac{Z_d}{Z_f} = -j\sqrt{\tfrac{1}{3}}. \quad (9')$$

While my phase-sequence relaying system is applicable, in some instances, to the detection of unbalanced faults other than single-phase grounds, its paramount use is in the detection of single-phase grounds exclusively, and the manner of calculating its performance will be illustrated only in connection with a line-to-ground fault, with the understanding that, in rare instances, other applications of my system may be made.

Figure 3:
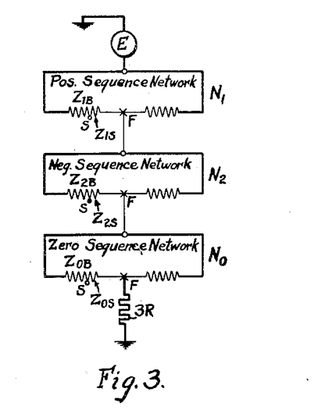
Fig. 3 is an equivalent sequence network diagram of the transmission system under the condition of a single-phase line-to-ground fault.

Upon the occurrence of a single ground fault, the equivalent circuit of the three-phase transmission system may be shown as consisting of the three sequence networks $N_1$, $N_2$ and $N_0$ connected in series (Fig. 3). This arises from the fact that the three sequence currents $I_1$, $I_2$ and $I_0$ are all equal, because ground current $I_A$ is flowing through the fault at F only through one phase, the other two line-to-ground currents $I_B$ and $I_C$ being zero. Thus, for a resistanceless fault, $$I_1 = I_2 = I_0 = \frac{I_A + O + O}{3} = \frac{E}{Z_1 + Z_2 + Z_0} = \frac{E}{2Z_2 + Z_0}, \quad (13)$$

where $Z_1$, $Z_2$ and $Z_0$ are the sequence impedances from the neutral buses of the respective sequence networks $N_1$, $N_2$ and $N_0$ to the fault, $Z_1$ being assumed to be equal to $Z_2$, as hereinbefore explained.

The equivalent voltage E used in the sequence network (Fig. 3) may be accurately calculated for every operating condition and every fault condition. I am assuming the application of my relay system to a line which is regulated for constant voltage. The equivalent voltage E of the sequence network diagram works out to be very nearly equal to the normal line-to-neutral terminal voltage or line voltage $E_{An}$ which is held constant at the terminals of each important machine by means of voltage regulators. At the middle section of a transmission line having a phase angle of, say 30° or $$\frac{\pi}{6}$$

between the regulated terminal voltages, the equivalent voltage may drop to $$\frac{E_{An} + E_{An} \epsilon^{j\frac{\pi}{6}}}{2},$$

or $$E_{An} \cos 15° = .966 \, E_{An},$$

but this reduced value of E will not materially vary over the region of the line controlled by a relay at said middle section, so that the relay may easily be set for proper action. The variation of the equivalent network voltage E with the load on the system will be found to be very slight, even making full allowance for the synchronous reactances of the machines being effective for normal operation and the much lower transient reactances being effective during faults. It is safe to assume, then, in general, that the network voltage E, for faults in line-sections near regulated synchronous machines, is equal to the regulated voltage $E_{An}$, and that, for intermediate sections, E ranges down to a minimum value of $E_{An}$ multiplied by the cosine of one-half of the angle between the two regulated voltages. In any case, the method of calculating the equivalent voltage E is well known from the previously mentioned Wagner and Evans articles.

For the conditions at the fault F, we have, then $$(2E_{A2} + E_{A0})_{F0} = -2I_2 Z_2 - I_0 Z_0 = -\frac{2Z_2 + Z_0}{2Z_2 + Z_0} \cdot E = -E. \quad (14)$$

When the fault has a ground resistance R, the phase sequence currents of Equation (13) are reduced to a value $$I_1 = I_2 = I_0 = \frac{E}{2Z_2 + Z_0 + 3R} \quad (13')$$

and the sequence voltage quantity of Equation 14 is reduced to $$(2E_{A2} + E_{A0})_F = -\frac{2Z_2 + Z_0}{2Z_2 + Z_0 + 3R} \cdot E. \quad (14')$$

If we write $(2Z_2 + Z_0) = jX$, that is, neglecting line resistance, the sequence voltage quantity becomes $$(2E_{A2} + E_{A0})_{F_R} = -\frac{jXE}{3R + jX} = -\frac{jX(3R - jX)E}{9R^2 + X^2} =$$

$$\frac{X}{\sqrt{9R^2 + X^2}} \cdot \frac{X + j(3R)}{\sqrt{9R^2 + X^2}} \cdot (-E) = \cos\theta \cdot \epsilon^{j\theta} \cdot (-E), \quad (15)$$

where $$\theta = \tan^{-1}\frac{3R}{X}.$$

By a comparison of Equations (15) and (14), it will be seen that the introduction of a ground resistance R has reduced the sequence fault voltage $(2E_{A2} + E_{A0})_F$ to $\cos\theta$ times its former value $-E$, and has also rotated the voltage through the angle $\theta$, where $$\theta = \tan^{-1}\frac{3R}{X}.$$

Expressed mathematically, $$(2E_{A2} + E_{A0})_{FR} = \cos\theta \cdot \epsilon^{\theta} \cdot (2E_{A2} + E_{A0})_{F_0}. \quad (16)$$

As shown in Equation (4) the phase sequence quantity or so-called network voltage (referring to the relaying network such as is shown in Fig. 2) is $$(2E_{A2} + E_{A0}) = E_A + j\frac{1}{\sqrt{3}} E_a.$$

Figure 4:
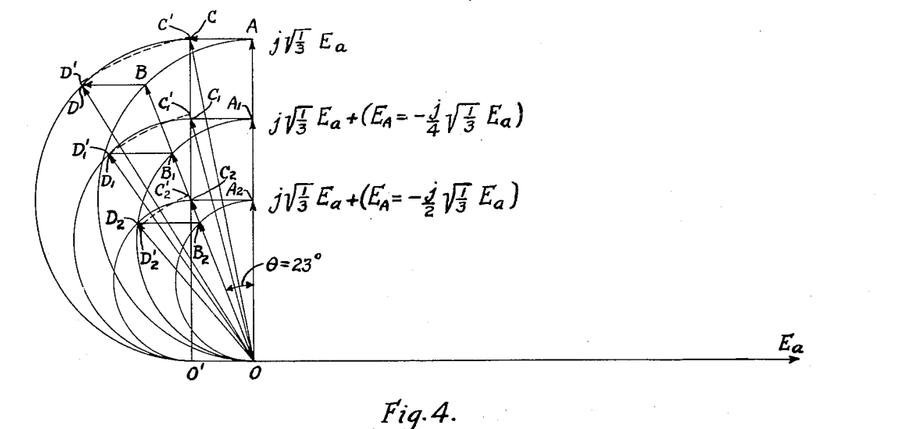
Fig. 4 is a vector diagram illustrative of the manner in which I cause the network voltage to be substantially unaffected by the value of the ground resistance.

At the fault, the voltage on the grounded phase is $$E_A = I_A R = \frac{3RE}{2Z_2 + Z_0 + 3R}, \quad (17)$$

as seen from Equation (13), R being the ground resistance. If $R = O$, $E_A = O$, and the network voltage at the fault becomes $$(2E_{A2} + E_{A0})_{F_0} = j\frac{1}{\sqrt{3}} E_a, \quad (18)$$

giving a vector diagram as shown in Fig. 4, wherein $\overline{OA}$ is the network voltage $$(2E_{A2} + E_{A0})_{F_0}.$$

It is shown in Equation (16) that, neglecting line resistance, the effect of introducing a resistance R in the fault is to reduce the network voltage at the fault to $\cos\theta$ times its former value and to advance its phase by the angle $\theta$, where $$\theta = \tan^{-1}\frac{3R}{X}.$$

Assuming $$R = X/7 = (.143)X, \quad \frac{3R}{X} = .43,$$

and $$\theta = \tan^{-1}(.43) = 23°,$$

as shown at AOB in Fig. 4.

The compensation of this ground resistance R, or of any resistance from $R = O$ to $R = (.143)X$, is preferably accomplished, according to my invention, by adding a component $$AC = j(0.2) OA = -\frac{0.2}{\sqrt{3}} E_a$$

in Fig. 4, or a larger component if a wider range of ground resistances is to be compensated for. Whatever the resistance range, the angle AOC should be substantially one-half of the corresponding angle AOB. The no-resistance network voltage $\overline{OA}$ is then shifted to $\overline{OC}$ and the maximum-resistance network voltage $\overline{OB}$ is shifted to $\overline{OD}$, where $\overline{OD}$ is numerically equal to $\overline{OC}$ instead of being only cos θ times the no-resistance voltage $\overline{OC}$.

As the ground resistance varies from $R=O$ to $R=X/7$, the terminus of the network voltage travels along the arc CD of the semi-circle constructed on the diameter CO', but the relay must be set for a constant voltage represented by an arc C'D' having O as center. By making OC' and OD' one percent larger than the network voltages OC and OD at the extremes $R=O$ and $$R = \frac{X}{3} \tan \theta,$$

the maximum error at any intermediate value of the ground resistance R will be approximately —1%, so that we have a relay system which will impose substantially the same voltage on a relay which is located close to a ground fault, regardless of the resistance of the ground. Ordinarily, a ground resistance as high as $R=X/7$ will not be encountered, so that the addition of a 20% correcting voltage A. C., as shown, will be more than sufficient, and as such addition does not introduce any substantial error in relaying, I have taken it as a standard part of my equipment.

At any line-sectionalizing point S removed from the fault (see Fig. 3), the sequence voltage quantity $(2E_{A2}+E_{AO})s$ will depend upon the division of the respective sequence currents $I_{2B}$ and $I_{OB}$ in the branches $Z_{2B}$ and $Z_{OB}$ in which the relay is located, and the line impedances $Z_{2S}$ and $Z_{OS}$ from the fault F to the end S of the line section. (See Fig. 3.) Thus, remembering that $$I_{2B} = I_2 \cdot \frac{Z_2}{Z_{2B}} \text{ and } I_{OB} = I_O \cdot \frac{Z_O}{Z_{OB}},$$

and also that $$I_2 = I_O = \frac{E}{2Z_2 + Z_O},$$

$$(2E_{A2}+E_{AO})s = (2E_{A2}+E_{AO})_F + 2I_{2B}Z_{2S} + I_{OB}Z_{OS} =$$
$$-E\left[1 - \frac{2Z_2}{2Z_2+Z_O}\left(\frac{Z_{2S}}{Z_{2B}}\right) - \frac{Z_O}{2Z_2+Z_O}\left(\frac{Z_{OS}}{Z_{2B}}\right)\right] =$$
$$\frac{-E}{2Z_2+Z_O}\left[2Z_2\left(1-\frac{Z_{2S}}{Z_{2B}}\right) + Z_O\left(1-\frac{Z_{OS}}{Z_{OB}}\right)\right], \quad (19)$$

which is the sequence voltage quantity $(2E_{A2}+E_{AO})s$ applied to a relay in phase A at a distance $(Z_{2S}, Z_{OS})$ from a ground fault in phase A, when $R=O$.

It is important to note that the sequence voltage $(2E_{A2}+E_{AO})$ is a maximum at the fault (i. e., when $Z_{2S}=O=Z_{OS}$), and that it falls off on either side of the fault. Also, it is zero when there is no fault, (i. e., when the the zero-phase-sequence impedance $Z_O$ is infinite). This is just the opposite of the line-voltage conditions, and is achieved by causing my relays to respond to an arbitrary artificial voltage derived from the negative and zero phase-sequence components.

Reference to the derivation of Equation (19), for the value of the phase-sequence quantity $(2E_{A2}+E_{AO})s$ at any point along the line, will show that the $Z_O$ in the denominator represents the total impedance encountered by the zero-sequence current $I_O$, and hence is to be changed to $(Z_O+3R)$ when resistance R is added to the fault. However, the $Z_O$ in the numerator belongs to the fraction $$\frac{Z_O}{Z_{OB}}$$

expressing the division of the zero-sequence current in the two branches of the zero-sequence network $N_O$, and this division of current is not affected by the addition of the equivalent fault resistance 3R. By changing $Z_O$, in the denominator of Equation (19), to $(Z_O+3R)$, it will be seen that the effect of the fault resistance R on the sequence voltage quantity at any sectionalizing point S is the same, therefore, as shown in Equation (14') for conditions at the fault; namely, to multiply the expression by $$\frac{2Z_2+Z_O}{2Z_2+Z_O+3R},$$

or to reduce the quantity in the ratio cos θ/1 and to shift the phase by the angle θ.

In Fig. 4, therefore, the effect of adding a fault resistance $R=X/7$ is shown for two different relaying points removed from the fault, where the phase-sequence quantity $(2E_{A2}+E_{AO})s$ is ¾ of its maximum value, as shown at $OA_1$ which is shifted to $OB_1$, and ½ of the maximum value, is shown at $OA_2$ which is shifted to $OB_2$. This is based on the fact that the delta voltage $E_a$ is substantially unaffected by a ground on phase A, and the assumption that the line-to-neutral voltage $E_A$ on the faulty phase does not shift in phase from its normal phase-relation during the existence of a fault. For more accurate calculation, the phase of $E_A$ with respect to $E_a$ may be figured out more exactly for any given line condition.

Referring to Fig. 4, it will be seen that the addition of my $\overline{AC}$ component $$\left(=-\frac{0.2}{\sqrt{3}}E_a\right)$$

will cause the resultant network voltage, for the two assumed relaying points, to vary from the value $OC_1$ to $OD_1$, and from the value $OC_2$ to $OD_2$, respectively, so that the relays at these points could be set to operate at some average value, as indicated by the dotted arcs $D_1'-C_1'$ and $D_2'-C_2'$, respectively. The radii of these arcs, which correspond to the relay settings, may be so chosen as to cover ground-resistance ranges of whatever value may be necessary; for example, from 40 to 100 ohms, or from 0 to 30 ohms, etc.

The calculations accompanying Fig. 4 have neglected the resistance of the line, the effect of which is to so change the phase of the $\overline{AC}$ voltage as to increase the range of variation of the ground resistance for any given value of $\overline{AC}$ and any given error in the relaying voltage.

It is to be noted that the error in the relaying voltage increases somewhat above 1% for relaying points removed from the fault, because the value $$\overline{AC} = -\frac{0.2}{\sqrt{3}}E_a$$

is too large for these conditions. It will be understood that $\overline{AC}$ may be adjusted for each relay installation, according to the distance from the other end of the line section, or that an average adjustment, say for the $\overline{OA_1}$ relaying point, may be made.

The addition of the component $$\left(\overline{AC} \text{ equals} -\frac{0.2}{\sqrt{3}}E_a\right)$$

will change the network voltage from the value defined in Equation (4) to a value $$(2E_{A2}+E_{AO})-\frac{0.2}{\sqrt{3}}E_a = E_A + .577(j-0.2)E_a. \quad (20)$$

To make the network voltage $$E_c = \frac{nZ_cZ_f}{Z_dZ_f+Z_c(Z_d+Z_f)}\left[E_A+\frac{Z_d}{nZ_f}E_a\right]$$

satisfy Equation (19), we must change Equation (9) to $$\frac{Z_d}{nZ_f} = .577(j-0.2).$$

$$Z_d = .577(j-0.2)nZ_f.$$

The values of the transformer ratio $n$ and the capacitance branch $Z_f$ of the network are so chosen, with respect to the inductance L of the relay, as to minimize the volt-ampere load on the potential transformer that supplies the $E_a$ voltage to the network. In other words, the scaler value of $I_f(I_fZ_f+Z_c)$ is to be a minimum. As this calculation is very tedious, I shall assume the values of $n$ and $Z_f$, as follows.

In order to use a standard transformer, it will be convenient to use a transformer ratio of usual value, such as $n=2$. If, then, the capacitance branch $Z_f=-jM$ equal in magnitude to the reactance component (jL) of the relay impedance $Z_c$, or $Z_f=-jL$, we find that $$Z_d = 1.154(1+0.2j)L$$
$$= (1.154)L+(0.231)jL,$$

which is a resistance (1.154)L in series with an inductance (0.231)jL.

It is not necessary for the reactance branch $Z_f$ to be pure capacitance. Thus, if it is a resistor in series with a condenser, for example, $Z_f=\frac{1}{6}-\frac{5}{6}j)L$ the value of the resistance branch would be $Z_d=(.923)L+(.385)jL$.

The additional $\overline{AC}$ voltage $$\left(-\frac{0.2}{\sqrt{3}}E_a\right),$$

which is supposed in Fig. 4 for the purpose of minimizing the effect of variations in the ground resistance on the voltage applied to the relays, may thus be introduced into the network by adding an inductance, such as $(0.231)jL$, to the resistance branch of the network, or by adding a resistance to the condenser branch $Z_f$ and an inductance to the resistance branch $Z_d$.

If small voltage relays are used, taking less than 10 volt-amperes for each phase, the duty on the potential transformers is light, and the capacity of the condenser in the $Z_f$ branch of the network may be kept down to a reasonably small value such as a few microfarads, or even less.

The phase-sequence network which I have described hereabove is not rendered inaccurate by reason of the transients resulting from the sudden collapse of the line-to-neutral voltage $E_A$, because these transients die out within a quarter of a cycle, as shown by calculations, whereas the relay operates in a time varying from about one-half of a cycle for nearby faults to about a cycle and a half for faults located near its balance point, or at the most remote distance to which the relay responds.

The foregoing discussion has had reference to modern grounded three-phase transmission systems in which voltage regulators are utilized to maintain the line voltage constant, and in which most or all of the step-up and step-down transformers are connected delta-star, with the neutral points grounded on the high-tension side.

If neutral grounding impedances are used, it is desirable, from the standpoint of my sequence relays, to utilize inductances rather than resistances, particularly at the receiving ends of the line, or at points far removed from the generators. The effect of the addition of grounding reactors is to increase both $Z_O$ and $Z_{OB}$ to values $(Z_O+jX_N)$ and $(Z_{OB}+jX_{NB})$, respectively, where $jX_N$ and $jX_{NB}$ are the reactances which would have to be added to the equivalent circuit in Fig. 3.

With grounding resistance and neutral grounding reactors added, the resulting modification of Equation (15) shows the resulting relaying voltage at any point S to be $$(2E_{A2}+E_{AO})_S = \frac{E}{2Z_2+Z_O+jX_N+3R}\left[2Z_2\left(1-\frac{Z_{2S}}{Z_{2B}}\right)+\right.$$
$$\left.(Z_O+jX_N)\left(1-\frac{Z_{OS}}{Z_{OB}+jX_{NB}}\right)\right]. \quad (15')$$

Since the grounding reactors which are represented by the effective zero-sequence reactances $jX_N$ and $jX_{NB}$ are added so as to introduce a component of voltage drop 90° out of phase with the voltage drop due to the fault resistance R, these grounding reactors increase the permissible value of fault resistance that may be tolerated for any given variation in the network voltage applied to the relay.

By equipping the sending end of the transmission line with a relatively high neutral grounding impedance (whether reactive, as above suggested, or pure resistance in order to lessen the forward swing of the generator when the real power falls off during the fault condition), and by equipping the receiving end with a relatively low neutral grounding reactance (as compared to the grounding impedance at the sending end), I am able, with my new relaying system, to make the zero-phase-sequence impedance $(Z_O+jN_N)$ a maximum when the fault is close to the generator and the negative-phase-sequence impedance $Z_2$ is a minimum. When the fault occurs at the receiving end, although $Z_O$ will be a minimum, the added effective grounding reactance $jN_N$ will assist the positive and negative sequence line impedance $2Z_2$ in keeping down the fault currents and upholding the sequence voltage quantity impressed on my relays.

Figure 1:
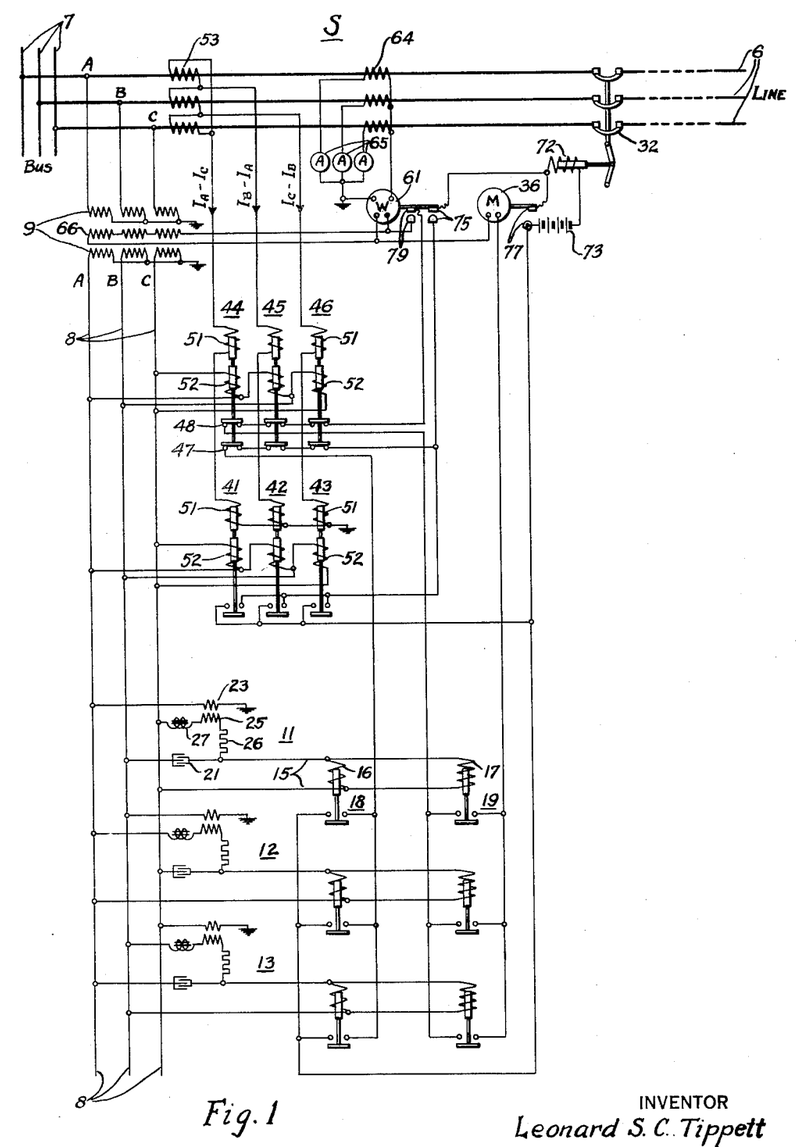
Figure 1 is a simplified wiring diagram of circuits and apparatus embodying my invention in a preferred form.

Fig. 1 illustrates a preferred embodiment of the circuits and apparatus for carrying into effect the above-described mathematical principles at one of the relaying stations or sectionalizing points S of a transmission system. This figure also embraces other features of my invention, which will subsequently be apparent.

Referring to Fig. 1, I have shown a three-phase transmission line 6 connected to a bus 7. A potential bus 8 is provided by means of star-star connected potential transformers 9 which are connected to the line either directly or by tapping off points on a condenser bushing or other well known means for deriving voltages proportional to, and in phase with, the respective line voltages.

My novel relaying system for producing a special phase-sequence network voltage for detecting single-phase grounds is shown at the bottom of Fig. 1 and comprises networks 11, 12 and 13 connected to the respective phases of the potential bus 8. As the several phases are symmetrical with respect to each other, the connections for only one of the networks, for example, 11, will be outlined.

The network 11 comprises a relay branch 15 which comprises two parallel-connected relay coils 16 and 17 of quick-acting over-voltage relays 18 and 19, respectively, which may be of either the plunger type or the clapper type, preferably the former.

This relay branch 15 of the network 11 is connected across the phase $E_a=E_b-E_c$ of the potential bus 8, in series with a condenser 21, the condenser terminal being connected to the $E_B$ voltage-lead. The junction point between the condenser 21 and the relay coils 16 and 17 is connected in the secondary circuit of an auxiliary transformer 23 which is the one referred to in the mathematical analysis by means of a transformer ratio $n$. The primary circuit of the transformer 23 is energized by the voltage $E_A$ by having one terminal connected to the voltage-lead $E_A$ and having the other terminal grounded, the circuit being completed by the ground which is provided on the neutral point of the Y-connected secondaries of the potential transformers 9.

The secondary circuit of the auxiliary transformer 23 is connected across the terminals of the relay branch 15 of the network 11, and it comprises, in addition to the secondary winding 25 of the auxiliary transformer, a serially connected resistor 26 and a serially connected choke coil or inductance device 27, the latter being for the purpose of compensating for the effect of variable ground resistance as hereinabove explained. It will thus be apparent that the conditions of Fig. 2 and of the mathematical analysis accompanying the same have been fulfilled.

Two relays 18 and 19 in each phase are utilized in order to provide suitable back-up protection. It will be recalled that the voltage network 11 does not impress any voltage on the relay circuit 15 during normal balanced operating conditions, but upon the occurrence of a fault, particularly a single-phase ground fault, a voltage is impressed, which is a maximum at the fault and which falls off to smaller and smaller values at points further and further removed from the fault.

Figure 5:
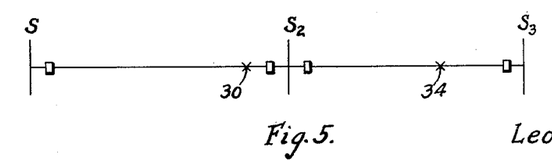
Fig. 5 is a schematic diagram of two sections of the transmission line, illustrating the method of setting the various relays.

Referring to Fig. 5, showing two sections $S-S_2$ and $S_2-S_3$ of the transmission line, it will be understood that the first relay 16 will be set to respond to single-phase grounds which are as far as possible from the relaying point S, without running the risk of responding to faults in section $S_2-S_3$ of the line. In the parlance of the relay art, therefore, the "balance point" of the relay 18 will be at some point 30 (Fig. 5) which may be from 90% to 97% of the length of the section $S-S_2$, depending upon the accuracy of the relay response. For single-phase ground faults occurring between the points S and 30, the relay 18 will receive a voltage sufficiently high to operate it, and hence the relay contacts will close and thereby energize the tripping circuit of the three-phase circuit breaker 32 in the line 6, as will subsequently be described.

As a so-called "back-up" protection, the second relay 19 is provided, having more turns than the first relay 18, so that it will respond, or pick up, for lower voltages than the first mentioned relay 18. The second relay 19 will have a balance point, therefore, somewhere in the line-section $S_2-S_3$, as indicated, for example, by the point 34 in Fig. 5, but the tripping action of the second relay 19 will be delayed, as by means of a synchronous timing motor 36 subsequently described, so that the second relay 19 does not trip the circuit breaker until the instantaneously acting protective devices closer to the fault have had a chance to operate and to clear the fault, by means of their respective circuit breakers.

My over-voltage ground-detecting relays 18 and 19, while not limited to this use, are primarily adapted for the detection of single-phase ground faults, which is the only condition for which the transmission system has been analyzed by the equivalent sequence network method in the explanations connected with Fig. 3 hereinabove. I believe that my sequence relaying scheme will have its best application in a system, such as shown in Fig. 1, wherein a set of three quick-acting impedance relays 41, 42 and 43 are utilized for the purpose of detecting, and responding to, line-to-line faults of all kinds, leaving my sequential relaying system with only the duty of responding to the single-phase line-to-ground faults exclusively. In order to prevent the tripping of the circuit breaker 32 in response to the picking up of the over-voltage relays 18 and 19, when a fault occurs across a delta or line-to-line phase, I preferably utilize a second set of quick-acting impedance relays 44, 45 and 46 having two sets of normally closed contacts 47 and 48 which are connected in series with the relays 18 and 19, respectively. It will be understood that the contacts of the three relays 18 which constitute parts of the three sequential networks 11, 12 and 13 are connected in parallel to each other, whereas the contacts 47 of the three auxiliary impedance relays 44, 45 and 46 are connected in series with each other and with the parallel connected contacts of the over-voltage relays 18. The same explanation holds true for the back-up over-voltage relays 19 and the contacts 48 of the auxiliary impedance relays.

The auxiliary impedance relays are connected to respond to the delta impedances of the transmission line 6, or to line-to-line faults thereon, in a manner similar to the ordinary impedance relays 41, 42 and 43, except that the ordinary impedance relays are set to have a balance point such as that indicated at 30 in Fig. 5 within the section of the line to which the relay is connected, whereas the auxiliary impedance relays 44, 45 and 46 may be set to have a balance point such as that indicated at 34 in Fig. 5 so as to respond to faults occurring somewhat beyond the limits of the line-section in which the relays are located.

By reason of the connection just described, the quick-acting auxiliary impedance relays 44, 45 and 46 pick up, and thus open their contacts, whenever a line-to-line fault occurs within relaying distance from the sequentially responsive over-voltage relays 18 or 19, thus rendering said over-voltage relays inoperative. Protection against such line-to-line faults is afforded by the ordinary quick-acting impedance relays 41, 42 and 43, the normally open contacts of which are connected in parallel to each other so as to trip the circuit breaker 32 whenever any one or more of said relays operates. I have omitted from Fig. 1, as being unessential to an understanding of the present invention, any showing of the back-up impedance relay protection, with timing elements, such as would be used with the so-called ordinary impedance relays 41, 42 and 43, as shown and described, for example, in an application of S. L. Goldsborough, Ser. No. 448,937, filed May 1, 1930, for quick-acting relays.

While I have described the impedance relays 41, 42 and 43 as "ordinary", I mean, by that appellation, to refer only to their construction, consisting of a current-responsive actuating coil 51 and a voltage-responsive restraining coil 52, so that the relay picks up at a predetermined impedance ratio of V/I.

The wiring diagram for both sets of impedance relays 41 to 46 is quite new in the relaying art, involving the use of my delta-connected current transformers, as described in the opening paragraphs of this specification, and as shown at 53 in Fig. 1. The current coils 51 of the impedance relays 41 to 46 are connected in star across the terminals of the delta-connected current transformers 53 which are responsive to the currents traversing the transmission line 6. The corresponding voltage coils 52 are connected in delta across the respective terminals of the potential bus 8. Thus, the current coils 51 of the impedance relays 43 and 46 are responsive to the delta current $I_a = I_C - I_B$, whereas the voltage coils 52 of the same relay are responsive to the delta voltage $E_a = E_C - E_B$.

All of the fault-responsive relays must be associated with a suitable instantaneous directional relay, which is illustrated schematically in Fig. 1 as a contact-making wattmeter element 61. The directional relay is for the purpose of permitting the tripping of the circuit breaker 32 only when the current is flowing away from the bus 7 into a fault out on the line 6 and to prevent the tripping of the circuit breaker upon the occurrence of reversely flowing currents which are flowing into a fault on another section.

Insofar as the protection of my ground-detector relays 18 and 19 is concerned, I prefer to utilize a directional relay 61 which is responsive to the zero-sequence currents and voltages of the line, as this gives a very simple and very accurate connection and operation of the directional relay, as shown in Fig. 1, wherein the current-coil terminals of the relay are connected in the residual-current circuit of the ordinary star-connected current transformers 64 which are illustrated as being connected to any conventional current-responsive devices, such as the ammeters 65. The voltage-coil terminals of the wattmeter directional element 61 are connected in a zero-phase-sequence voltage circuit afforded by the provision of a tertiary winding 66 on each of the three potential transformers 9, said tertiary windings being connected in series with each other to supply the voltage-responsive current to the wattmeter 61.

The circuit breaker 32 is provided with a trip coil 72 which is energized from a battery 73, the circuit being completed by the contacts of the instantaneous phase-sequence-responsive relays 18 in series with the normally closed contacts 47 of the auxiliary impedance relays 44 to 46 and the contacts 75 of the directional relay 61.

Another circuit completing the energization of the tripping coil 72 from the battery 73 comprises the contacts of the so-called ordinary impedance relays 41 to 43, in series with the contacts 75 of the directional relay 61. This connection has been shown merely for the sake of simplicity, as it will be understood, of course, that the directional relay 61, which is responsive to zero-phase sequence currents and voltages, will not be responsive for balanced three-phase faults. Ordinarily, another type of directional relay connection would be used for the so-called ordinary impedance relays 41 to 43, as shown, for example, in the above-mentioned Goldsborough application, but for simplicity I have shown only the one directional relay 61 which is adapted primarily for the selection of unbalanced grounds on the line.

A third circuit for energizing the tripping coil 72 from the battery 73 comprises the contacts 77 of a timing mechanism, such as the previously mentioned synchronous motor 36. This motor 36, except for balanced three-phase faults which are not fully provided for in the simplified relay system shown in Fig. 1, is energized from the zero-phase sequence voltage which is provided by the tertiary transformer windings 66, the motor circuit being completed whenever any one of the back-up voltage relays 19 is operated, provided that none of the auxiliary impedance relays 44 to 46 is operated at the same time, and provided also, that auxiliary contacts 79 on the directional relay 61 are closed, indicating that the power is flowing from the bus into the fault. The length of time for which the timing motor 36 is set is very slightly in excess of the time required to clear a fault by means of the instantaneously operating fault detecting relays and the circuit breaker 32, so that the timing relay will not become effective unless the instantaneously operating protective devices fail to clear the fault properly.

While I have indicated certain preferred forms and embodiments of my invention, and while I have indicated its theory of operation and the method of calculating and applying the same in sufficient detail to enable those skilled in the art to successfully put my invention into practice, I do not care to be altogether limited to the embodiments and theories herein stated, as many modifications within the spirit of my invention are obviously possible. I desire, therefore, that the appended claims be given the broadest construction consistent with their language and the prior art.

In the foregoing description, while I have assumed that the negative-phase-sequence line-impedance $Z_2$ to a ground fault is equal to the positive-phase-sequence impedance $Z_1$, and have referred to a relaying component ($2E_{A2}$) equal to twice the negative-phase-sequence voltage-component of the line, it is to be understood that desirable results may be obtained when there is considerable departure from the value 2, particularly in transmission systems in which $Z_2$ is greater or less than $Z_1$, in which case the proportionality factor 2 should be correspondingly lower or higher, respectively. I wish the factor 2 to be construed, therefore, in the specification and claims, with this leeway understood.

In the foregoing specification and in the appended claims, when the context or the prior art does not require a different interpretation, the term "line-to-line fault" is to be construed in its broadest sense to refer to any fault involving two or more phase-conductors of a polyphase line.

I claim as my invention:

1. A fault-detecting relay means for three-phase transmission lines, characterized by selectively responding to the zero-phase-sequence component of the line-to-ground voltage at the relaying point, plus twice the negative-phase-sequence component thereof.

2. The combination including a three-phase transmission line having a circuit breaker and a ground-detecting relaying equipment for tripping said circuit breaker, characterized by the fact that said relaying equipment comprises an over-voltage relay, and means for energizing the same with a voltage proportional to the scalar value of the vector-quantity $(E_A+.577(j-u)E_a)$, where $E_A$ is one of the star voltages of the line, $E_a$ is the opposite delta voltage, and $u$ is a fraction suitable for causing the resultant relay voltage to be substantially unaffected by variations in ground resistance.

3. A relaying equipment for detecting, and selectively operating according to the distance of, certain types of faults on a polyphase transmission line, comprising an over-voltage relay, a network for selectively responding in a predetermined manner to the sequence-voltage-components of the line for applying a derived voltage to said relay, and means for locking out the action of the relay except when a fault of its particular type occurs on the line.

4. Relaying means for selectively responding to faults of a particular type, to wit single-phase grounds, on a three-phase transmission line, comprising an over-voltage relay for each of the three phases, means for impressing each relay with a derived voltage proportional to the zero-phase-sequence component of the line-to-ground voltage at the relaying point, plus twice the negative-phase-sequence component thereof, plus a voltage component suitable for causing the resultant relay voltage to be substantially unaffected by variations in ground resistance, and means for locking out the action of the relay except when a fault of its particular type occurs on the line.

5. A polyphase voltage source and a voltage-responsive relaying network comprising a relay coil and a serially connected impedance connected across one phase of the polyphase source, and an auxiliary transformer having its secondary winding and another serially connected impedance connected in shunt across the relay coil, the primary winding of said auxiliary transformer being energized from another phase of said polyphase source.

6. A three-phase voltage source and a voltage-responsive relaying network comprising two serially connected impedances connected across one phase of the polyphase source, and an auxiliary transformer having its secondary winding and another serially connected impedance connected in shunt across one of the first-mentioned impedances, the primary winding of said auxiliary transformer being energized from another phase of said polyphase source.

7. A polyphase voltage-responsive relaying network comprising two serially connected impedances connected across one phase of a polyphase source, and an auxiliary transformer having its secondary winding and another serially connected impedance connected in shunt across one of the first mentioned impedances, the primary winding of said auxiliary transformer being energized from another phase of said polyphase source, one of said three impedances being an over-voltage relay coil, and the values of the respective impedances being such that the coil receives a current proportional to a predetermined function of said two phases of the source.

8. Relaying means for selectively responding to faults of a particular type, to wit single-phase grounds, on a three-phase transmission line, comprising a potential-bus source of derived three-phase voltages having a potential suitable for relaying, a three-phase voltage-responsive relaying network comprising two serially connected impedances connected across one phase of the three-phase source, and an auxiliary transformer having its secondary winding and another serially connected impedance connected in shunt across one of the first-mentioned impedances, the primary winding of said auxiliary transformer being energized from another phase of said three-phase source, one of said three impedances being an over-voltage relay coil, and the values of the respective impedances being such that the coil receives a current proportional to the scalar value of the vector sum of one of the line-to-ground voltages of the source, plus a voltage-component substantially equal to $.577\ j$ times the opposite delta voltage of the source, plus a modifying voltage-component derived from said delta voltage suitable for causing the resultant relay voltage to be substantially unaffected by variations in the resistance of a ground fault on the line-phase corresponding to the said line-to-neutral voltage of the source.

9. A fault-detecting relaying system for a three-phase transmission line comprising a network connected to a line-to-ground voltage-phase and also to the opposite delta voltage-phase, said network including a voltage-responsive relay receiving a derived voltage differing from either of said voltage-phases of the transmission line.

10. A relaying system for one end of a polyphase transmission line section, characterized by having a circuit-breaker, a fault-detecting relaying device for tripping said circuit-breaker in response to unbalanced ground faults on the line, and a directional relay means which is energized from only the zero-phase-sequence component of the line current and only the zero-phase sequence component of the line-to-ground voltage for rendering the fault-detecting relaying device ineffective when the line current is flowing toward the relaying point from the other end of the line section.

11. A relaying system for a polyphase transmission line, characterized by having a circuit-breaker, a quick-acting fault-detecting relaying device for tripping said circuit-breaker in response to unbalanced ground faults on the line, a second fault-detecting relaying device responsive to the same kind of faults as the first one but operative when the faults are further away, and a time-delay mechanism set in operation by said second device for tripping said circuit-breaker only after a predetermined time interval which is greater than the time required to clear the fault in response to the first-mentioned relaying device, characterized further by the fact that said time-delay mechanism comprises an electrical motor and means for energizing said motor from only a zero-phase-sequence power component of the line.

12. A relaying system for a polyphase transmission line, characterized by having a circuit-breaker, a quick-acting fault-detecting relaying device for tripping said circuit-breaker in response to single-phase ground faults on the line, a second fault-detecting relaying device responsive to the same kind of faults as the first one but operative when the faults are further away, a normally-closed-contact relaying device responsive to line-to-line faults which are at least about as far away as the maximum distance to which said second relaying device responds, said normally closed contacts being in series with both of said ground-detecting relaying devices so as to prevent their functioning whenever a line-to-line fault occurs, and a time-delay mechanism set in operation by said second device for tripping said circuit-breaker only after a predetermined time interval which is greater than the time required to clear the fault in response to the first-mentioned relaying device.

13. Relaying means for selectively responding to faults of a particular type, to wit single-phase grounds, on a three-phase transmission line, comprising an over-voltage relay for each of the three phases, means for impressing each relay with a derived voltage proportional to the zero-phase-sequence component of the line voltage at the relaying point, plus twice the negative-phase-sequence component thereof, plus a voltage component suitable for causing the resultant relay voltage to be substantially unaffected by variations in ground resistance, and means for locking out the action of the relay except when a fault of its particular type occurs on the line, said locking-out means comprising a relaying device responsive to line-to-line faults and comprising voltage coils and current coils, characterized by having delta-connected current transformers responsive to the line currents for energizing said current coils, the latter being connected in star, and the voltage coils being connected across the corresponding delta voltages.

14. Relaying means for selectively responding to faults of a particular type, to wit single-phase grounds, on a three-phase transmission line, comprising a potential-bus source of derived three-phase voltages having a potential suitable for relaying, a three-phase voltage-responsive relaying network comprising two serially connected impedances connected across one phase of the three-phase source, and an auxiliary transformer having its secondary winding and another serially connected impedance connected in shunt across one of the first-mentioned impedances, the primary winding of said auxiliary transformer being energized from another phase of said three-phase source, one of said three impedances being an over-voltage relay coil, and the values of the respective impedances being such that the coil receives a current proportional to the scalar value of the vector sum of one of the line-to-neutral voltages of the source, plus a voltage-component substantially equal to .577 $j$ times the opposite delta voltage of the source, plus a modifying voltage-component derived from said delta voltage suitable for causing the resultant relay voltage to be substantially unaffected by variations in the resistance of a ground fault on the line-phase corresponding to the said line-to-neutral voltage of the source, and means for locking out the action of the relay except when a fault of its particular type occurs on the line, said locking-out means comprising a relaying device responsive to line-to-line faults and comprising voltage coils and current coils, characterized by having delta-connected current transformers responsive to the line currents for energizing said current coils, the latter being connected in star, and the voltage coils being connected across the corresponding delta voltages.

15. A relaying system for a polyphase transmission line, characterized by having a circuit-breaker, a quick-acting fault-detecting relaying device for tripping said circuit-breaker in response to single-phase ground faults on the line, a second fault-detecting relaying device responsive to the same kind of faults as the first one but operative when the faults are further away, a normally-closed-contact relaying device responsive to line-to-line faults which are at least as far away as the maximum distance to which said second relaying device responds, said normally closed contacts being in series with both of said ground-detecting relaying devices so as to prevent their functioning whenever a line-to-line fault occurs, and a time-delay mechanism set in operation by said second device for tripping said circuit-breaker only after a predetermined time interval which is greater than the time required to clear the fault in response to the first-mentioned relaying device, and further characterized by the fact that said normally closed-contact relaying device has voltage coils and current coils, the current coils being connected in star and energized from delta-connected current transformers responsive to the line currents, and the voltage coils being connected across the corresponding delta voltages.

16. Protective and measuring equipment for a circuit-breaker station on a polyphase transmission system comprising a relaying device responsive to line-to-line faults and comprising voltage coils and current coils, characterized by having delta-connected current transformers responsive to the line currents for energizing said current coils, the latter being connected in star, and the voltage coils being connected across the corresponding delta voltages, and further characterized by having a directional relay, and a second set of line-current transformers connected in star and supplying current to other protective and/or measuring equipment for the line, said directional relay having a current coil connected in the neutral circuit of said star-connected current transformers.

17. Relaying equipment for detecting, and responding to the distance of, certain faults on a polyphase transmission line, characterized by a polyphase network connected across the transmission line, the network being of such character as to derive a single-phase voltage which is a maximum when the fault is close to said network and which becomes smaller with an increase in the distance of the fault on either side of the network, and an over-voltage relay, the relay coil being connected to respond to said derived single-phase voltage so as to pick up whenever such a fault occurs on the line within a predetermined distance from the network.

18. A fault-detecting relay means for three-phase transmission lines, characterized by selectively responding to the zero-phase-sequence component of the line-to-ground voltage at the relaying point, plus a multiple of the negative-phase-sequence voltage, suitable for producing a sum which, at the fault, is substantially constant regardless of the location of the fault, and which decreases as the relaying point is moved away from the fault.

19. A fault-detecting relay means for three-phase transmission lines, characterized by selectively responding to the zero-phase-sequence component of the line-to-ground voltage at the relaying point, plus a multiple of the negative-phase-sequence voltage, suitable for producing a sum which, at the fault, is substantially equal to the normal line-to-ground voltage of the transmission line, and which decreases as the relaying point is moved away from the fault.

20. A fault-detecting relay means for three-phase transmission lines, characterized by selectively responding to the zero-phase-sequence component of the line-to-ground voltage at the relaying point, plus a multiple of the negative-phase-sequence voltage, suitable for producing a sum which, at the fault, is substantially constant regardless of the location of the fault, and which decreases as the relaying point is moved away from the fault, plus a component derived from a voltage phase approximately 90° out of phase with the grounded phase, suitable for substantially eliminating the effect of the resistance of the ground on the relay voltage.

21. A fault-detecting relay means for three-phase transmission lines, characterized by selectively responding to the zero-phase-sequence component of the line-to-ground voltage at the relaying point, plus a multiple of the negative-phase-sequence voltage, suitable for producing a sum which, at the fault, is substantially equal to the normal line-to-ground voltage of the transmission line, and which decreases as the relaying point is moved away from the fault, plus a component derived from a voltage phase approximately 90° out of phase with the grounded phase, suitable for substantially eliminating the effect of the resistance of the ground on the relay voltage.

22. A fault-detecting relay equipment for a three-phase power line, characterized by means for deriving a relaying voltage which, at the fault, is substantially constant, regardless of the location of the fault, and which decreases as the relaying point is moved away from the fault, and an overvoltage relay responsive to said relaying voltage.

LEONARD S. C. TIPPETT.